United States Patent
Kim et al.

(10) Patent No.: US 8,045,646 B2
(45) Date of Patent: Oct. 25, 2011

(54) APPARATUS FOR ESTIMATING PHASE ERROR AND PHASE ERROR CORRECTION SYSTEM USING THE SAME

(75) Inventors: Pan-Soo Kim, Daejon (KR); Byoung-Hak Kim, Daejon (KR); Yun-Jeong Song, Daejon (KR); Deock-Gil Oh, Daejon (KR); Ho-Jin Lee, Daejon (KR); Jun Heo, Seoul (KR); Joong-Gon Ryoo, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 709 days.

(21) Appl. No.: 12/094,851

(22) PCT Filed: Sep. 11, 2006

(86) PCT No.: PCT/KR2006/003601
§ 371 (c)(1),
(2), (4) Date: May 23, 2008

(87) PCT Pub. No.: WO2007/061174
PCT Pub. Date: May 31, 2007

(65) Prior Publication Data
US 2008/0273585 A1    Nov. 6, 2008

(30) Foreign Application Priority Data
Nov. 25, 2005  (KR) .................. 10-2005-0113699

(51) Int. Cl.
*H03K 9/00* (2006.01)
(52) U.S. Cl. ........ 375/316; 375/226; 375/326; 375/340; 714/780; 702/181; 704/240
(58) Field of Classification Search .......... None
See application file for complete search history.

(56) References Cited

U.S. PATENT DOCUMENTS
6,856,656 B2  2/2005  Eidson et al.
(Continued)

FOREIGN PATENT DOCUMENTS
JP  07-058676  3/1995
(Continued)

OTHER PUBLICATIONS

Vincenzo Lottici et al., "Embedding Carrier Phase Recovery Into Iterative Decoding of Turbo-Coded Linear Modulations", IEEE Transactions on Communications, vol. 52, No. 4, Apr. 2004, pp. 661-669.

(Continued)

*Primary Examiner* — Dac Ha
*Assistant Examiner* — Adolf Dsouza
(74) *Attorney, Agent, or Firm* — Kile Park Goekjian Reed & McManus PLLC

(57) ABSTRACT

Provided are an apparatus for estimating a phase error and a phase error correcting system using the phase error estimating apparatus. The apparatus includes: a probability value estimating unit for estimating a negative log probability value for each transmission symbol by transforming a soft output information transferred from the outside to a log A posterior probability ratio (LAPPR) value; an APP value calculating unit for calculating a posterior probability (APP) value by applying a negative exponential function to the transmission symbol; an average value deciding unit for deciding an average value for each transmission symbol using the probability information entirely, partially, or selectively according to a probability information type; and a symbol phase estimating unit for estimating a phase of a symbol based on the decided average value.

8 Claims, 2 Drawing Sheets

U.S. PATENT DOCUMENTS 6,968,021 B1 * 11/2005 White et al. .................. 375/340
2002/0150168 A1 * 10/2002 Crawford ..................... 375/260

FOREIGN PATENT DOCUMENTS

| JP | 11-340883 | 12/1999 |
| JP | 2003-348064 | 5/2003 |
| KR | 10-2000-0040480 | 7/2000 |
| KR | 10-2005-0086318 | 8/2005 |
| KR | 10-2006-0059640 | 6/2006 |
| KR | 10-2006-0072096 | 6/2006 |

OTHER PUBLICATIONS

International Search Report for PCT/KR2006/003601 dated Dec. 26, 2006.

* cited by examiner

APPARATUS FOR ESTIMATING PHASE ERROR AND PHASE ERROR CORRECTION SYSTEM USING THE SAME

TECHNICAL FIELD

The present invention relates to an apparatus for estimating a phase error and a phase error correcting system using the same; and, more particularly, to an apparatus for estimating a phase error and a phase error correcting system using the same for correcting a carrier phase error to restore a received signal in a Time Division Multiple Access (TDMA) satellite communication system.

BACKGROUND ART

In a wired/wireless communication system, an original signal is restored from a received signal by modulating the received signal through a radio frequency (RF) module and an intermediate frequency (IF) module. Due to the incompleteness of an analog local oscillator in the RF/IF module, a signal having a carrier frequency error is inputted into a demodulator during baseband down-conversion. Also, a signal having a Doppler frequency error is inputted into a demodulator. The frequency errors disable the received signal from being recovered. Therefore, the received signal is generally restored after the frequency errors are removed from the received signal through a frequency restoring circuit in a baseband.

Although the frequency errors are removed from the received signal, a phase error is remained in the received signal. The remained phase error is shown as a predetermined phase pattern with irregular noise. Although the phase error is very small, the phase error significantly degrades the performance when a receiver employs an error correction code such as a turbo code that provides superior performance in a low signal-to-noise ratio. In order to overcome such a drawback, a conventional method for estimating a phase error was introduced in an article by Vincenzo Lottici and Marco Luise, entitled "embedding Carrier Phase Recovery Into Interactive Decoding of Turbo-Coded Linear Modulation", *IEEE transactions On Communications*, Vol. 52, no. 4, April, 2004. In the conventional method for estimating a phase error, a maximum likelihood (ML) mode is applied into the phase error estimation.

The conventional method estimates the phase error under an assumption that a phase error model is uniform in one data block. That is, the conventional method considers a comparatively simple phase error model for estimating phase error. Also, the conventional method uses the average of all symbols to obtain the probability value of transmission symbols obtained from a turbo decoder.

In order to restore a received signal in a TDMA satellite communication system, the carrier phase error must be corrected. Especially, a system using an error correction code such as a turbo code requires a noise-resistant phase correction method because a small phase error significantly degrades performance in the system using an error correction code such as a turbo code operated in a low signal to noise ratio.

DISCLOSURE

Technical Problem

It is, therefore, an object of the present invention to provide a phase error estimating apparatus and a phase error correcting system using the same for enabling a phase error estimating apparatus to repeatedly correct a phase error using the probability information of a transmission signal, which is generated from a turbo decoder in order to estimate a phase error in a baseband.

Technical Solution

In accordance with one aspect of the present invention, there is provided an apparatus for estimating a phase error which includes: a probability value estimating unit for estimating a negative log probability value for each transmission symbol by transforming a soft output information transferred from the outside to a log A posterior probability ratio (LAPPR) value; an APP value calculating unit for calculating a posterior probability (APP) value by applying a negative exponential function to the transmission symbol; an average value deciding unit for deciding an average value for each transmission symbol using the probability information entirely, partially, or selectively according to a probability information type; and a symbol phase estimating unit for estimating a phase of a symbol based on the decided average value.

In accordance with another aspect of the present invention, there is provided a phase error correcting system for correcting a carrier phase error by the apparatus for estimating a phase error, which is characterized as noise-resistant phase error correction in a low signal-to-noise ratio by enabling a phase error estimator to repeatedly correct a phase error using probability information of a transmission signal outputted from a turbo decoder.

Advantageous Effects

According to the present invention, a phase error can be further accurately estimated from the outside by correcting a phase error in a baseband without modifying a turbo decoder for restoring a signal in a TDMA burst MODEM type transmission system.

DESCRIPTION OF DRAWINGS

The above and other objects and features of the present invention will become apparent from the following description of the preferred embodiments given in conjunction with the accompanying drawings, in which.

BEST MODE FOR THE INVENTION

Other objects and advantages of the invention will become apparent from the following description of the embodiments with reference to the accompanying drawings, which is set forth hereinafter.

Figure 1:
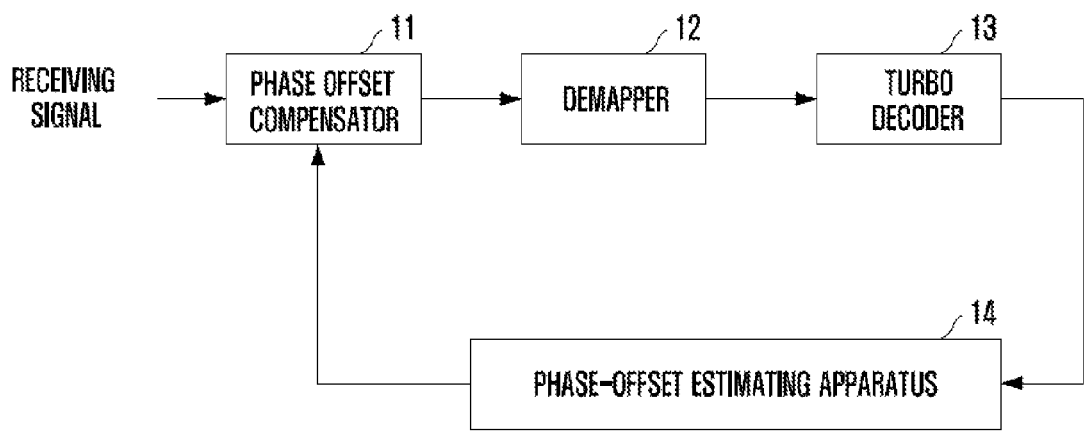
FIG. 1 is a block diagram illustrating a phase error correcting system having an apparatus for estimating a phase error in accordance with an embodiment of the present invention.

FIG. 1 is a block diagram illustrating a phase error correcting system using an apparatus for estimating a phase error in accordance with an embodiment of the present invention. Referring to FIG. 1, the phase error correcting system according to the present embodiment includes a phase error corrector 11, a demapper 12, a turbo decoder 13 and a phase error estimating apparatus 14.

As shown in FIG. 1, the demapper 12 and the turbo decoder 13 are conventional units for turbo decoding, which are well known to those skilled in the art. The phase error correcting system corrects a phase by additionally including the phase error estimating apparatus 14 according to the present invention for estimating a phase error.

That is, the phase error correcting system using the phase error estimating apparatus according to the present embodiment performs the noise-resistant phase error correction even in a low signal to noise ratio by enabling the phase error estimating apparatus 14 to repeatedly correct the phase error using the probability information of transmission signal generated from the turbo decoder 13.

Figure 2:
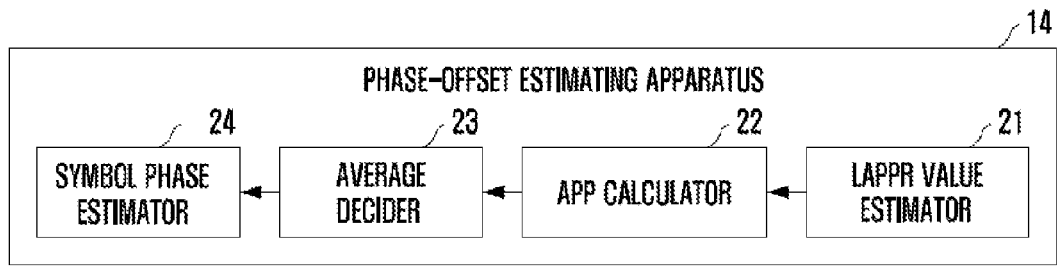
FIG. 2 is a block diagram illustrating an apparatus for estimating a phase error in accordance with an embodiment of the present invention.

FIG. 2 is a block diagram illustrating a phase error estimating apparatus in accordance with an embodiment of the present invention.

Referring to FIG. 2, the phase error estimating apparatus 14 according to the present embodiment includes a LAPPR value estimator 21, an APP calculator 22, an average decider 23, and a symbol phase estimator 24. The LAPPR value estimator 21 estimates a negative log probability value, which is probability information, for each transmission symbol by transforming soft output information transferred from the turbo decoder 13 to a log a posterior probability ratio (LAPPR) value. The APP calculator 22 calculates a posterior probability value (APP) by applying a negative exponential function for each transmission symbol. The average value decider 23 decides an average value for each transmission symbol differently using the probability information of the transmission signal generated from a turbo decoder according to the type of the probability information. That is, one of the entire probability information, the predetermined portion of the probability information, and the selected probability information is used according to the type of the probability information to decide the average value. The symbol phase estimator 24 estimates a phase of a symbol.

Herein, the LAPPR value estimator 21 can be expressed as Eq. 1.

$$L(b_k) = \log\left(\frac{P_r\{b_k = 1 \mid r\}}{P_r\{b_k = -1 \mid r\}}\right) \quad \text{Eq. 1}$$

In Eq. 1, r denotes a receiving signal which is a symbol, and $b_k$ denotes a bit corresponding to a received symbol. Also, the received signal r can be expressed as Eq. 2.

$$r_k = c_k \cdot e^{j(2\pi \Delta f T_k + \theta_k)} + n_k \quad \text{Eq. 2}$$

In Eq. 2, $c_k$ is a modulated symbol, and $n_k$ is an additive white Gaussian noise. $\Delta f T_k$ denotes a carrier frequency error or Doppler frequency error, and $\theta_k$ denotes a carrier phase error.

The average decider 23 decides an average of transmitted symbols using an APP all average mode, an APP partial average mode, and an APP maximum selection mode. Then, the symbol phase estimating unit 24 estimates a phase of a symbol based on the decided symbol average value, and the phase error corrector 11 of FIG. 1 corrects the error based on the estimated phase error.

Figure 3:
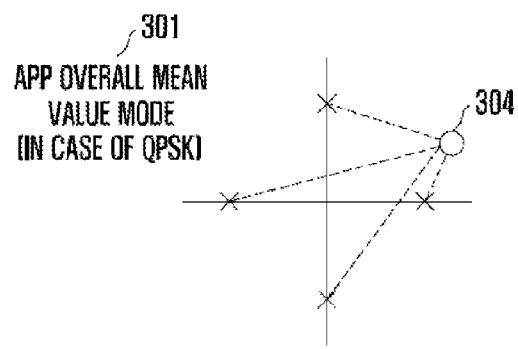
FIGS. 3 to 5 are graphs showing a probability information applying structure of an average estimator in a phase error estimating apparatus in accordance with an embodiment of the present invention.
Figure 4:
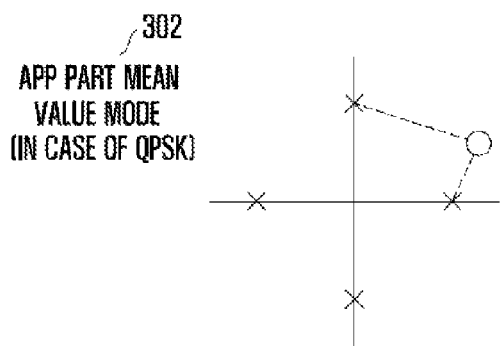
Figure 5:
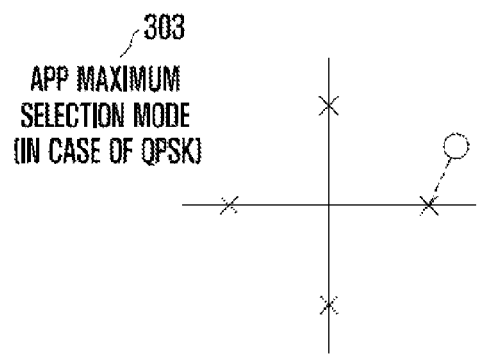

FIGS. 3 to 5 are graphs showing a probability information applying structure of an average estimator in a phase error estimating apparatus in accordance with an embodiment of the present invention. A numeral reference 301 denotes the APP all average mode, a numeral reference 302 denotes the APP partial average mode, and a number reference 303 denotes the APP selection mode in a quadrature phase shift keying (QPSK).

In FIG. 3, the APP all average mode 301 calculates probability values of all QPSK symbols and calculates an average value thereof in order to estimate the QPSK symbol of a received signal 304 which is received by a receiver. It can be expressed as Eq. 3.

$$E(C) = \overline{C_n} = \sum_{n=0}^{L-1} P(C_n)C_n = \sum_{n=0}^{L-1} \frac{e^{-SO_e(C_n)}}{\sum_{n=0}^{L-1} e^{-SO_e(\tilde{C}_n)}} C_n \quad \text{Eq. 3}$$

In Eq. 3, $C_n$ denotes a modulated symbol, and $SO_e(C_n)$ denotes a soft output of $C_n$, that is, a LAPPR value outputted from the turbo decoder 13. L is the number of modulated symbols. For example, L is 4 for QPSK.

FIG. 4 is the APP partial average mode 302 that uses N modulated symbols having higher relativity among L modulated symbols without using all LAPPR values outputted from the turbo decoder 13 differently from APP all average mode 301 of FIG. 3A. For example, two probability values which have higher relativity are selected from four modulated symbols in the QPSK modulation mode in FIG. 4.

FIG. 5 is the APP maximum selection mode 303 that uses a value having the highest relativity among the LAPPR values outputted from the turbo decoder 13. The APP maximum selection mode 303 may be identical to the APP partial average mode 302 when N is 1.

As described above, the phase error estimating apparatus according to the present embodiment repeatedly corrects the phase error by estimating a phase error in a baseband using the probability information of the transmission signal outputted from the turbo decoder. When the estimated value of the transmitted symbol is decided, the probability information of the transmission signal is applied using one of the introduced methods, the APP all average mode, the APP partial average mode, and the APP maximum selection mode. The estimated transmission symbol is used to estimate a phase in an external phase error estimator. As a method of deciding the estimated value of the transmission symbol from the probability information, it is divided into a case of reducing a complexity, a case of improving a performance, and a case of compromising the complexity reducing case and the performance improving case.

The above described method according to the present invention can be embodied as a program and stored in a computer-readable recording medium. The computer readable recording medium is any data storage device that can store data which can be read by a computer system. The computer readable-recording medium includes a read-only memory (ROM), a random-access memory (RAM), a CD-ROM, a floppy disk, a hard disk and an optical magnetic disk.

The present application contains subject matter related to Korean patent application No. 2005-0113699, filed with the Korean Intellectual Property Office on Nov. 25, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. An apparatus for estimating a phase error, comprising:
a probability value estimating means for estimating a negative log probability value for each transmission symbol by transforming a soft output information transferred from the outside to a log A posterior probability ratio (LAPPR) value;
an APP value calculating means for calculating a posterior probability (APP) value by applying a negative exponential function to the transmission symbol;
an average value deciding means for deciding an average value for each transmission symbol, using the negative log probability value, according to a selected probability information type selected among a plurality of probability information types; and
a symbol phase estimating means for estimating a phase of a symbol based on the decided average value.

2. The apparatus as recited in claim 1, wherein the probability value estimating means is expressed as:

$$L(b_k) = \log\left(\frac{P_r\{b_k = 1 \mid r\}}{P_r\{b_k = -1 \mid r\}}\right),$$

where r denotes a receiving signal which is a symbol; $b_k$ denotes a bit corresponding to a received symbol; and the receiving signal r is expressed as:

$$r_k = c_k \cdot e^{j(2\pi \Delta f T_k + \theta_k)} + n_k,$$

where $c_k$ is a modulated symbol; $n_k$ is an additive white Gaussian noise; $\Delta f T_k$ denotes a carrier frequency error or Doppler frequency error; and $\theta_k$ denotes a carrier phase error.

3. The apparatus as recited in claim 1, wherein the probability information type is selected among the plurality of probability information types including an APP all average mode, an APP partial average mode and an APP maximum selection mode.

4. The apparatus as recited in claim 1, wherein the average value deciding means calculates probability values with all QPSK symbols and calculates the average thereof through the APP all average mode in order to estimate a QPSK symbol of a received signal at a receiver, and the average value deciding means is expressed as:

$$E(C) = C_n = \sum_{n=0}^{L-1} P(C_n)C_n = \sum_{n=0}^{L-1} \frac{e^{-SO_e(C_n)}}{\sum_{n=0}^{L-1} e^{-SO_e(\bar{C}_n)}} C_n,$$

where $C_n$ denotes a modulated symbol; $SO_e(C_n)$ denotes a soft output of $C_n$, that is, a LAPPR value outputted from the turbo decoder; and L is the number of modulated symbols.

5. The apparatus as recited in claim 1, wherein the average value deciding means selects N modulated symbols having higher relativity among L modulated symbols without using all of LAPPR values outputted from a turbo decoder through the APP partial average mode.

6. The apparatus as recited in claim 1, wherein the average value deciding means selects a value having the highest relativity among LAPPR values outputted from the turbo decoder through the APP maximum selection mode.

7. A phase error correcting system for correcting a carrier phase error, comprising:
a phase error estimating apparatus which includes:
a probability value estimating means for estimating a negative log probability value for each transmission symbol by transforming a soft output information transferred from the outside to a log A posterior probability ratio (LAPPR) value;
an APP value calculating means for calculating a posterior probability (APP) value by applying a negative exponential function to the transmission symbol;
an average value deciding means for deciding an average value for each transmission symbol using the probability information entirely, partially, or selectively according to a probability information type; and
a symbol phase estimating means for estimating a phase of a symbol based on the decided average value,
wherein the phase error estimating apparatus repeatedly corrects a phase error based on probability information of a transmission signal outputted from a turbo decoder to correct a phase error at a low signal-to-noise ratio.

8. The phase error correcting system as recited in claim 7, wherein the phase error estimating apparatus includes:
a probability value estimating means for estimating a negative log probability value for each transmission symbol by transforming a soft output information transferred from the outside to a log A posterior probability ratio (LAPPR) value;
an APP value calculating means for calculating a posterior probability (APP) value by applying a negative exponential function to the transmission symbol;
an average value deciding means for deciding an average value for each transmission symbol using the probability information entirely, partially, or selectively according to a probability information type; and
a symbol phase estimating means for estimating a phase of a symbol based on the decided average value.

* * * * *